US010662968B2

(12) United States Patent
Son et al.

(10) Patent No.: US 10,662,968 B2
(45) Date of Patent: May 26, 2020

(54) METHOD OF MANUFACTURING CENTRIFUGAL FAN

(71) Applicant: LG ELECTRONICS INC., Seoul (KR)

(72) Inventors: Sang Yuk Son, Changwon-si (KR); Kyung Jung Lee, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 870 days.

(21) Appl. No.: 14/443,196

(22) PCT Filed: May 9, 2014

(86) PCT No.: PCT/KR2014/004162
§ 371 (c)(1),
(2) Date: May 15, 2015

(87) PCT Pub. No.: WO2014/182126
PCT Pub. Date: Nov. 13, 2014

(65) Prior Publication Data
US 2016/0186770 A1 Jun. 30, 2016

(30) Foreign Application Priority Data

May 10, 2013 (KR) .................. 10-2013-0053262
Apr. 15, 2014 (KR) .................. 10-2014-0045018

(51) Int. Cl.
*F04D 29/28* (2006.01)
*F04D 29/62* (2006.01)
(Continued)

(52) U.S. Cl.
CPC ............ *F04D 29/281* (2013.01); *B21D 11/20* (2013.01); *B21J 5/00* (2013.01); *B21K 3/04* (2013.01);
(Continued)

(58) Field of Classification Search
CPC ...... F04D 29/281; F04D 17/10; F04D 29/626; F04D 29/441; F04D 29/30; F04D 29/282;
(Continued)

(56) References Cited

U.S. PATENT DOCUMENTS

| 1,154,152 A | 9/1915 | Williams |
| 1,447,915 A | 3/1923 | Watkins |

(Continued)

FOREIGN PATENT DOCUMENTS

| CN | 1327129 | 12/2001 |
| CN | 1712733 | 12/2005 |

(Continued)

OTHER PUBLICATIONS

United States Office Action dated Jun. 7, 2017 issued in co-pending related U.S. Appl. No. 14/443,198.

(Continued)

*Primary Examiner* — Moshe Wilensky
(74) *Attorney, Agent, or Firm* — Ked & Associates LLP

(57) ABSTRACT

A method of manufacturing a centrifugal fan is provided that includes cutting a metal sheet to form a positive pressure surface forming member and a negative pressure surface forming member, respectively, forming a positive pressure surface and a negative pressure surface; pressing the positive pressure surface forming member and the negative pressure surface forming member to form a first curved surface forming the positive pressure surface and a second curved surface forming the negative pressure surface; trimming the positive pressure surface forming member provided with the fast curved surface and the negative pressure surface forming member provided with the second curved surface to form a shroud bonding surface and a main plate bonding surface; bending the shroud bonding surface and the main plate bonding surface; bonding the positive pressure surface (Continued)

forming member and the negative pressure surface forming member and the negative pressure surface forming member to each other; and bonding the shroud bonding surface and a shroud to each other and bonding the main plate bonding surface and a main plate to each other in a bonded state of the positive pressure surface forming member and the negative pressure surface forming member.

19 Claims, 14 Drawing Sheets

(51) Int. Cl.
    *B23K 11/00*     (2006.01)
    *B23K 11/11*     (2006.01)
    *B23K 11/16*     (2006.01)
    *B23K 26/32*     (2014.01)
    *B23K 26/244*     (2014.01)
    *F04D 29/30*     (2006.01)
    *F04D 17/10*     (2006.01)
    *F04D 29/44*     (2006.01)
    *B21D 11/20*     (2006.01)
    *B21J 5/00*     (2006.01)
    *B21K 3/04*     (2006.01)
    *B23K 101/00*     (2006.01)
    *B23K 103/04*     (2006.01)

(52) U.S. Cl.
    CPC .......... *B23K 11/0026* (2013.01); *B23K 11/11* (2013.01); *B23K 11/115* (2013.01); *B23K 11/16* (2013.01); *B23K 26/244* (2015.10); *B23K 26/32* (2013.01); *F04D 17/10* (2013.01); *F04D 29/282* (2013.01); *F04D 29/30* (2013.01); *F04D 29/441* (2013.01); *F04D 29/626* (2013.01); *B23K 2101/001* (2018.08); *B23K 2103/04* (2018.08); *Y10T 29/49329* (2015.01)

(58) Field of Classification Search
    CPC .......... B21D 11/20; B21K 3/04; B23K 11/11; B23K 26/244; B23K 26/32; B23K 11/0026; B23K 11/115; B23K 11/16; B23K 2201/001; B23K 2203/04; B21J 5/00
See application file for complete search history.

(56) References Cited

U.S. PATENT DOCUMENTS

| | | |
|---|---|---|
| 1,676,946 A | 7/1928 | Fechheimer |
| 2,329,696 A | 9/1943 | Chester |
| 2,779,424 A | 1/1957 | Lyon |
| 2,916,199 A | 12/1959 | Loehr |
| 3,144,204 A | 8/1964 | Bohanon |
| 3,272,429 A | 9/1966 | Wood |
| 3,306,528 A | 2/1967 | Eck |
| 3,426,965 A | 2/1969 | Kulling |
| 3,694,881 A | 10/1972 | Glucksman |
| 4,165,950 A | 8/1979 | Masai et al. |
| 4,236,871 A | 12/1980 | Hirst et al. |
| 4,531,890 A * | 7/1985 | Stokes ................... F04D 29/282 416/187 |
| 4,666,373 A | 5/1987 | Sugiura |
| 4,804,819 A | 2/1989 | Farrow |
| 4,874,293 A | 10/1989 | Gutzwiller |
| 4,971,521 A | 11/1990 | Atarashi et al. |
| 5,209,639 A | 5/1993 | Neuber et al. |
| 5,241,230 A | 8/1993 | Tanaka et al. |
| 5,249,927 A | 10/1993 | Vera |
| 5,328,332 A | 7/1994 | Chiang |
| 5,336,050 A | 8/1994 | Guida et al. |
| 5,693,992 A | 12/1997 | Kurusu et al. |
| 5,767,476 A | 6/1998 | Imamura |
| 5,800,128 A | 9/1998 | Bodmer et al. |
| 6,039,539 A | 3/2000 | Berg |
| 6,132,826 A | 10/2000 | Kawasaki et al. |
| 6,156,090 A | 12/2000 | Ishikawa et al. |
| 6,220,819 B1 | 4/2001 | Chien et al. |
| 6,368,062 B1 | 4/2002 | Yagami et al. |
| 6,478,538 B2 | 11/2002 | Kim |
| 6,494,676 B2 | 12/2002 | Yokoyama et al. |
| 6,508,627 B2 | 1/2003 | Gerken et al. |
| 6,558,120 B2 | 5/2003 | Kim et al. |
| 6,634,856 B2 | 10/2003 | Chien et al. |
| 6,679,682 B2 | 1/2004 | Lee |
| 7,632,065 B2 | 12/2009 | Kawabata et al. |
| 8,007,240 B2 | 8/2011 | Sanagi et al. |
| 8,186,958 B2 | 5/2012 | Lee et al. |
| 8,257,043 B2 | 9/2012 | Kuroki |
| 8,454,316 B2 | 6/2013 | Svensson |
| 8,668,460 B2 | 3/2014 | Han et al. |
| 2006/0228212 A1 | 10/2006 | Sadi |
| 2007/0098556 A1 | 5/2007 | Sanagi et al. |
| 2010/0202886 A1 | 8/2010 | Iwata et al. |
| 2011/0023526 A1 | 2/2011 | Ohyama |
| 2012/0055656 A1 | 3/2012 | Han et al. |

FOREIGN PATENT DOCUMENTS

| | | |
|---|---|---|
| CN | 1756908 | 4/2006 |
| CN | 1802512 | 7/2006 |
| CN | 201265533 | 7/2009 |
| CN | 101715518 | 5/2010 |
| CN | 101821513 | 9/2010 |
| CN | 101960150 | 1/2011 |
| CN | 101990604 | 3/2011 |
| CN | 102834220 | 12/2012 |
| CN | 102927044 | 2/2013 |
| EP | 0 133 845 | 3/1985 |
| EP | 2 275 689 | 1/2011 |
| GB | 18349 | 6/1911 |
| GB | 796696 | 6/1958 |
| JP | 55-35169 | 3/1980 |
| JP | 57-35199 | 2/1982 |
| JP | 5-305376 | 11/1993 |
| JP | 2000-45997 | 2/2000 |
| JP | 2001-300812 A | 10/2001 |
| JP | 2002-235695 A | 8/2002 |
| JP | 3111526 | 7/2005 |
| JP | 2007-205269 | 8/2007 |
| JP | 2008-002379 | 1/2008 |
| JP | 2009-150380 | 7/2009 |
| JP | 2010-053803 | 3/2010 |
| JP | 2011-058442 A | 3/2011 |
| JP | 2011-208501 | 10/2011 |
| JP | 2011-226448 A | 11/2011 |
| KR | 10-2006-0008988 | 1/2006 |
| KR | 10-2010-0066561 A | 6/2010 |
| KR | 10-2010-0134011 | 10/2010 |
| KR | 20-2010-0010533 | 10/2010 |
| KR | 10-2012-0023320 A | 3/2012 |
| TW | I285706 | 8/2007 |
| WO | WO 2008/129475 | 10/2008 |

OTHER PUBLICATIONS

Korean Office Action dated Mar. 7, 2017 issued in Application No. 10-2017-0026942.
U.S. Appl. No. 14/443,198, filed May 15, 2015.
U.S. Appl. No. 14/443,116, filed May 15, 2015.
Korean Office Action dated Jan. 24, 2017.
European Search Report dated Sep. 9, 2016 issued in Application No. EP 14771179.0.
Korean Office Action dated Oct. 15, 2016 issued in Application No. 10-2014-0040179.
European Search Report dated Sep. 30, 2015.
European Search Report dated Nov. 19, 2015.
European Search Report dated Jan. 27, 2016.
Korean Office Action dated Mar. 24, 2016.

(56) References Cited

OTHER PUBLICATIONS

Chinese Office Action dated May 4, 2016 (201480003049.0) (translation).
Chinese Office Action dated May 4, 2016 (201480002996.8) (translation).
Chinese Office Action dated Jun. 21, 2016 (translation).
Chinese Office Action dated Jul. 5, 2016 (translation).
United State Office Action dated Sep. 7, 2017 issued in co-pending related U.S. Appl. No. 14/443,116.
International Search Report issued in Application No. PCT/KR2014/004162 dated Sep. 16, 2014.
International Search Report dated Sep. 4, 2014 issued in Application No. PCT/KR2014/003920.
International Search Report issued in Application No. PCT/KR2014/004158 dated Sep. 15, 2014.
International Search Report dated Sep. 16, 2014 issued in Application No. PCT/KR2014/004152.
United States Office Action dated Jul. 13, 2018 issued in co-pending related U.S. Appl. No. 14/443,185.
U.S. Appl. No. 14/443,185, filed May 15, 2015.
U.S. Office Action issued in U.S. Appl. No. 14/443,185 dated Sep. 11, 2019.
U.S. Office Action issued in U.S. Appl. No. 14/443,185 dated Mar. 3, 2020.

\* cited by examiner

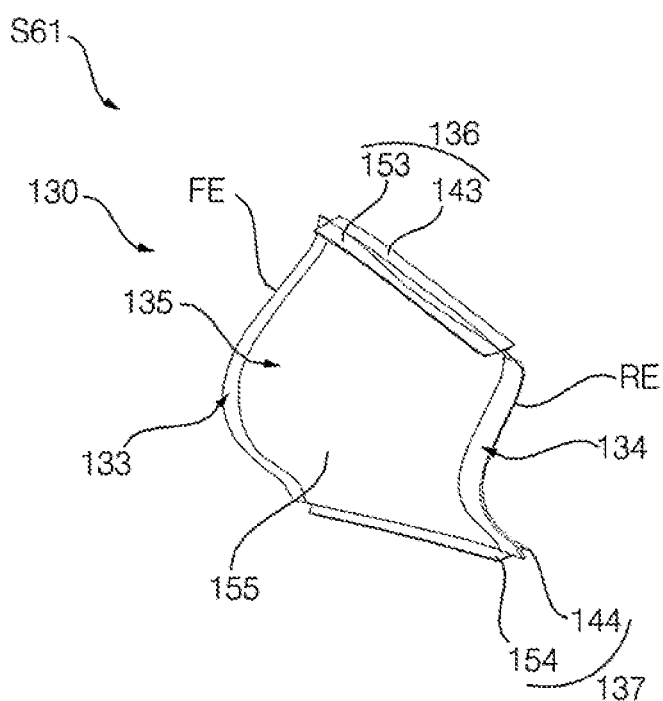

METHOD OF MANUFACTURING CENTRIFUGAL FAN

METHOD OF MANUFACTURING CENTRIFUGAL FAN

This application claims priority to International Patent Application No. PCT/KR2014/004162, filed May 9, 2014, which claims priority to Korean Application Nos. KR 10-2013-0053262 and KR 10-2014-0045018 filed in Korea on May 10, 2013 and Apr. 15, 2014, respectively, whose entire disclosures are hereby incorporated by reference.

BACKGROUND

1. Field

A method of manufacturing a centrifugal fan is disclosed.

2. Background

A centrifugal fan is a fan that accelerates air introduced in an axial direction through a shroud and discharges the air in a radial direction through gaps between blades. Such a centrifugal fan may be formed of a synthetic resin or metal. A resin centrifugal fan advantageously permits manufacture of blades having various shapes via injection molding, but has poor strength. Therefore, centrifugal fans to be applied to large products are appropriately formed of a metal.

Conventionally, a metal centrifugal fan is manufactured by cutting a metal sheet in a given shape, bending the metal sheet to define a positive pressure surface portion and a negative pressure surface portion, and thereafter, bonding the positive pressure surface portion and the negative pressure surface portion to each other. For example, Japanese Patent Laid-open Publication No. 2000-45997 discloses a blade formed by bending a single metal sheet. In the above patent, the blade formed by bending a single metal sheet has an airfoil cross section. More particularly, the blade has a three dimensional shape in which a leading edge of the blade has a predetermined inclination relative to a rotational axis of a centrifugal fan and a trailing edge of the blade is parallel to the rotational axis. However, as exemplarily shown in the above patent, respective, airfoil cross sections of the blade taken at arbitrary layers perpendicular to the rotational axis have a common camber line. For example, although a lower edge of the blade bonded to a main plate has a longest camber line and an upper edge of the blade coming into contact with a shroud has a shortest camber line, the camber line at the upper edge completely overlaps the camber line at the lower edge. The blade having the above-described shape is an inevitable consequence of bending a single metal sheet using a mold that defines a single camber line as exemplarily shown in the above patent.

As described above, although Japanese Patent Laid-open Publication No. 2000-045997 discloses the metal blade, the blade has a limit in terms of shape, thus having difficulty in having a complicated three dimensional shape, such as, for example, a shape in which a camber line of an airfoil taken at an upper cross section of the blade and a camber line of an airfoil taken at a lower cross section of the blade cross each other, in other words, a twisted shape in a rotational axis.

It is one object to provide a method of manufacturing a centrifugal fan capable of providing more diversified shapes of a positive pressure surface or a negative pressure surface.

It is another object to provide a method of manufacturing a centrifugal fan having a blade comprised of two metal members.

It is another object to provide a method of manufacturing a centrifugal fan having a blade of a complicated three dimensional shape that has not been easily achieved using a metal in the related art.

It is another object to provide a method of manufacturing a centrifugal fan capable of achieving reduced material cost and enhanced rigidity.

It is another object to provide a method of manufacturing a centrifugal fan capable of being applied to larger products than in the related art.

It is another object to provide a method of manufacturing a centrifugal fan having a blade in which a positive pressure surface and a negative pressure surface are curved surfaces having different curvature variations.

It is another object to provide a method of manufacturing a centrifugal fan capable of achieving reduced flow resistance, more particularly, enhanced efficiency via improvement in the shape of a blade.

It is another object to provide a method of manufacturing a centrifugal fan capable of allowing a blade having a three dimensional shape to be easily coupled to a shroud or a main plate.

It is a further object to provide a method of manufacturing a centrifugal fan capable of minimizing welding beads between members, thereby restricting increase in flow resistance and minimizing a negative effect on balancing of the fan due to the welding beads.

In accordance with one embodiment, the above and other objects can be accomplished by the provision of a method of manufacturing a centrifugal fan, the method including the steps of: (a) cutting a metal sheet to form a positive pressure surface forming member and a negative pressure surface forming member respectively configuring a positive pressure surface and a negative pressure surface; (b) pressing the positive pressure surface forming member and the negative pressure surface forming member to form a first curved surface portion configuring the positive pressure surface and a second curved surface portion configuring the negative pressure surface; (c) trimming the positive pressure surface forming member provided with the first curved surface portion and the negative pressure surface forming member provided with the second curved surface portion to form a shroud bonding surface portion and a main plate bonding surface portion; (d) bending the shroud bonding surface portion and the main plate bonding surface portion; (e) bonding the positive pressure surface forming member and the negative pressure surface forming member to each other; and (f) bonding the shroud bonding surface portion and a shroud to each other and bonding the main plate bonding surface portion and a main plate to each other in a bonded state of the positive pressure surface forming member and the negative pressure surface firming member.

The first curved surface portion and the second curved surface portion may define different shapes of curved surfaces.

In the step (c), trimming may be implemented such that an upper edge and a lower edge of each of the positive pressure surface forming member and the negative pressure surface forming member are bent independently of a front edge of each forming member in the step (d). The step (e) may include bonding front edges of the respective forming members to each other and bonding rear edges of the respective forming members to each other. At least one of bonding between the front edges of the respective forming members and bonding between the rear edges of respective forming members may be implemented by resistance welding. The resistance welding may be implemented at a plurality of positions aligned in a line from the shroud to the main plate in a state in which the front edges or the rear edges of the respective forming members come into contact with each other. The resistance welding may be spot welding.

The resistance welding may be projection welding, and the method further include the step of forming protrusions at any one of the positive pressure surface forming member and the negative pressure surface forming member so as to protrude toward the other one. The protrusion forming step may include forming the protrusions at a plurality of positions, aligned in a line from the shroud to the main plate, on at least one of the front edge and the rear edge of any one of the positive pressure surface forming member and the negative pressure surface forming member. The step (e) may include simultaneously melting the protrusions.

The method may further include the step of processing a rivet hole in at least one of the shroud bonding surface portion and the main plate bonding surface portion, and the step (f) may include fastening a rivet through the rivet hole to couple at least one of the shroud bonding surface portion and the main plate bonding surface portion to the shroud or the main plate. The step (f) may include bonding each of the shroud bonding surface portion and the main plate bonding surface portion to the shroud or the main plate in a fastened state of the rivet. Bonding between the shroud bonding surface portion and the shroud or bonding between the main plate bonding surface portion and the main plate may be implemented by resistance welding. The resistance welding may be spot welding implemented at a plurality of positions aligned in a line from the front edge to the rear edge of each forming member.

The method may further include the step of repeatedly implementing the step (b) after the step (d).

According to embodiments, a method of manufacturing a centrifugal fan has the effects of achieving higher rigidity than that of a conventional centrifugal fan formed of a resin material and of enhancing performance of the fan owing to a three dimensional shape of blades.

In addition, as a result of processing two thin metal sheets respectively and bonding the same to each other, the present invention has the effect of enabling formation of a blade having a complicated three dimensional shape that has not been easily achieved in the related art.

In addition, the blade comprised of the two sheets, moreover, has the effect of achieving less material cost, higher efficiency of the fan owing to weight reduction and reduced power consumption than in the related art.

In addition, since two members are first processed as curved members respectively and then bonded to each other to construct a blade, the members have independent shapes of curved surfaces, which has the effect of enabling formation of a blade having a complicated three dimensional shape (for example, a positive pressure surface and a negative pressure surface of the blade are curved surfaces having different curvature variations).

In addition, the metal blade having a complicated shape has the effect of reducing flow resistance and enhancing performance of the fan, more particularly, efficiency of the fan.

In addition, the embodiments has the effect of easily coupling the blade having a three dimensional surface to a shroud or a main plate.

In addition, welding beads between members may be minimized, which has the effect of restricting increase in flow resistance and minimizing a negative effect on balancing of the fan due to the welding heads.

In addition, no bonding portion or coupling portion between constituent members of the blade is present at the positive pressure surface or the negative pressure surface, which has the effect of reducing flow resistance.

In addition, embodiments has the effect of achieving increased strength and reduced ductility due to characteristics of plastic working.

BRIEF DESCRIPTION OF THE DRAWINGS

FIGS. 9A to 9I are views showing the manufacture sequence of the centrifugal fan according to the embodiments.

DETAILED DESCRIPTION

Advantages and features and a method of achieving the same will be more clearly understood from embodiments described below in detail with reference to the accompanying drawings. However, embodiments are not limited to the following embodiments and may be implemented in various different forms. The embodiments are provided merely to complete disclosure of the present invention and to provide those skilled in the art with the category. The invention is defined only by the claims. Wherever possible, the same reference numbers will be used throughout the specification to refer to the same or like parts.

Figure 1:
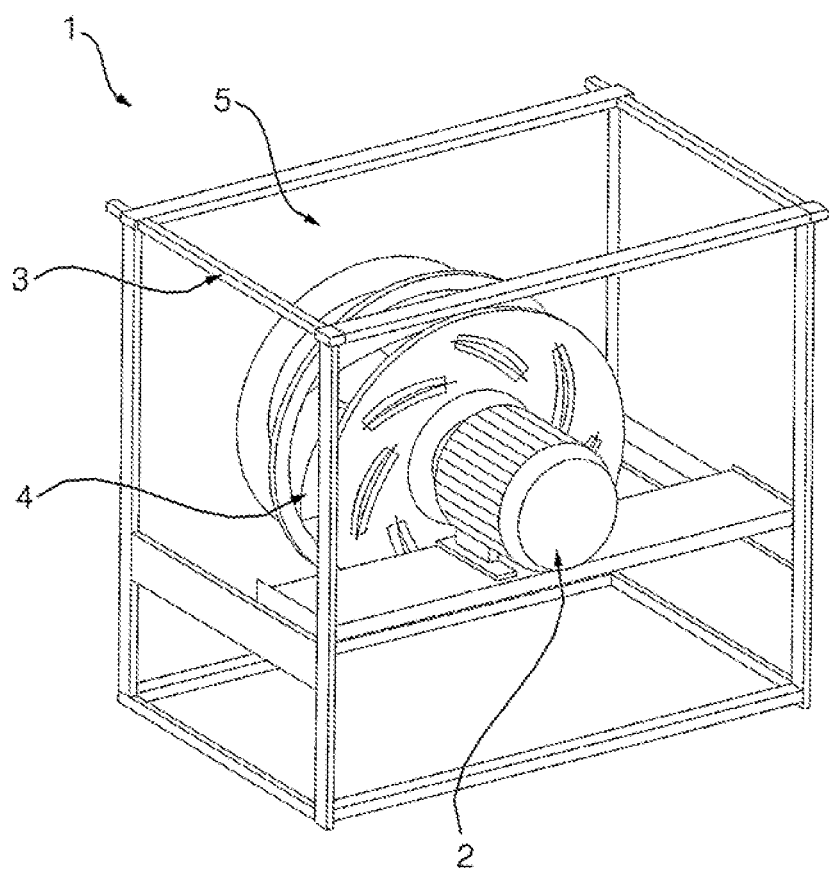
FIG. 1 is a view showing one example of a fan module usable with a centrifugal fan.

FIG. 1 is a view showing one example of a tan module usable with a centrifugal fan. The centrifugal fan according to the embodiments that will be described hereinafter may be applied to refrigerators, air conditioners, cleaners and the like. The centrifugal fan may be installed without a duct because it provides natural introduction and discharge of air into and from a fan. In particular, the centrifugal fan may be applied to a fan module for use in an air conditioner which is installed at an outdoor place as exemplarily shown in FIG. 1 and serves to cool or heat air directed from an indoor space and then resupply the air into the indoor space. The fan module 1 as described above includes a motor 2 having a rotational shaft, a support frame 3 supporting the motor 2 and a centrifugal fan 4 coupled to the rotational shaft of the motor 2. In addition, a front panel 5 coupled to a front surface of the support frame 3 has an opening through which air can be introduced into the centrifugal fan 4. The air introduced in a longitudinal direction of the rotational shaft through the opening is discharged in a radial direction from a rear region of the front panel 5 as the centrifugal fan 4 is rotated.

Figure 2:
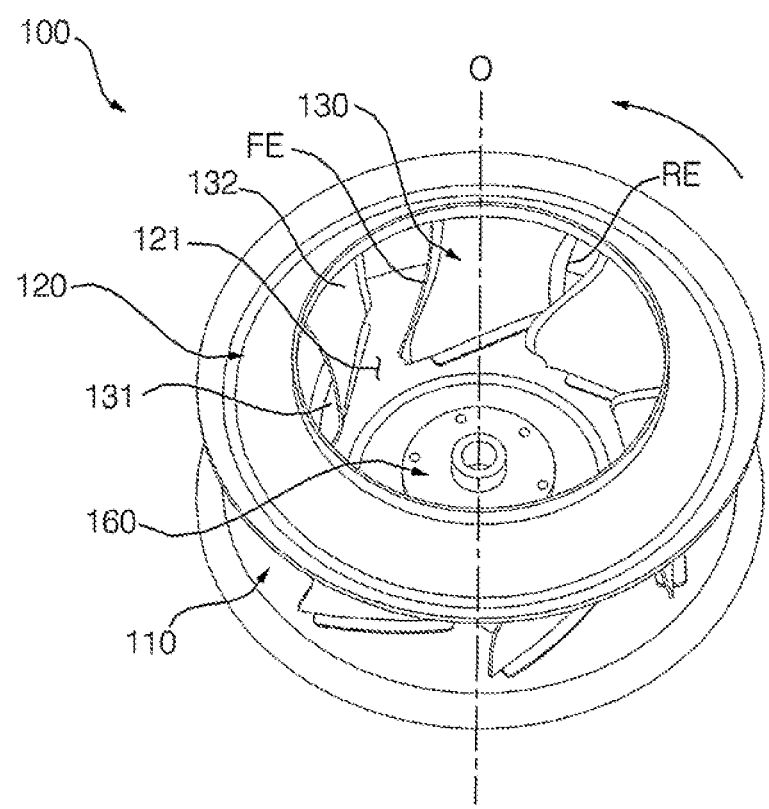
FIG. 2 is a perspective view showing a centrifugal fan according to one embodiment.
Figure 3:
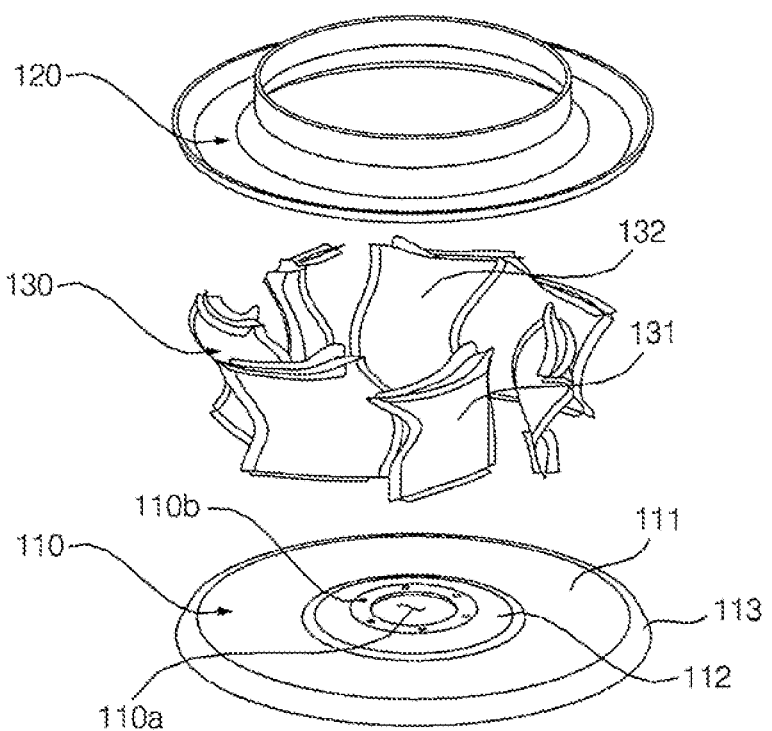
FIG. 3 is an exploded perspective view of the centrifugal fan shown in FIG. 2.
Figure 4A:
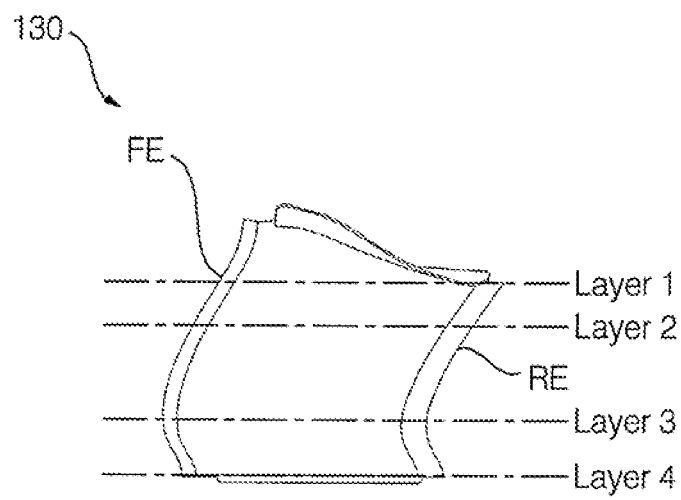
FIGS. 4A-4B are a view showing positions of layers marked at the blade and cross sections of the blade taken at the layers, respectively.
Figure 4B:
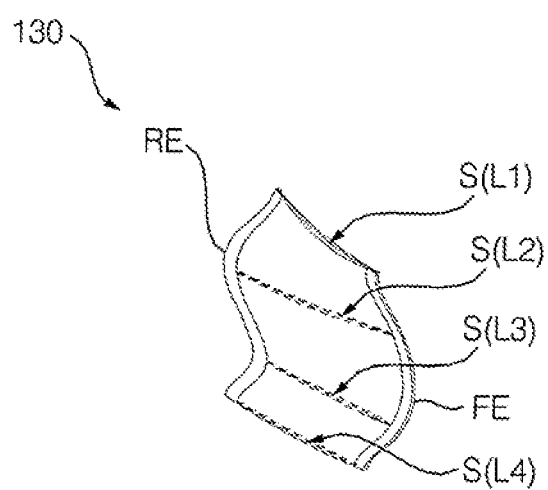
Figure 5:
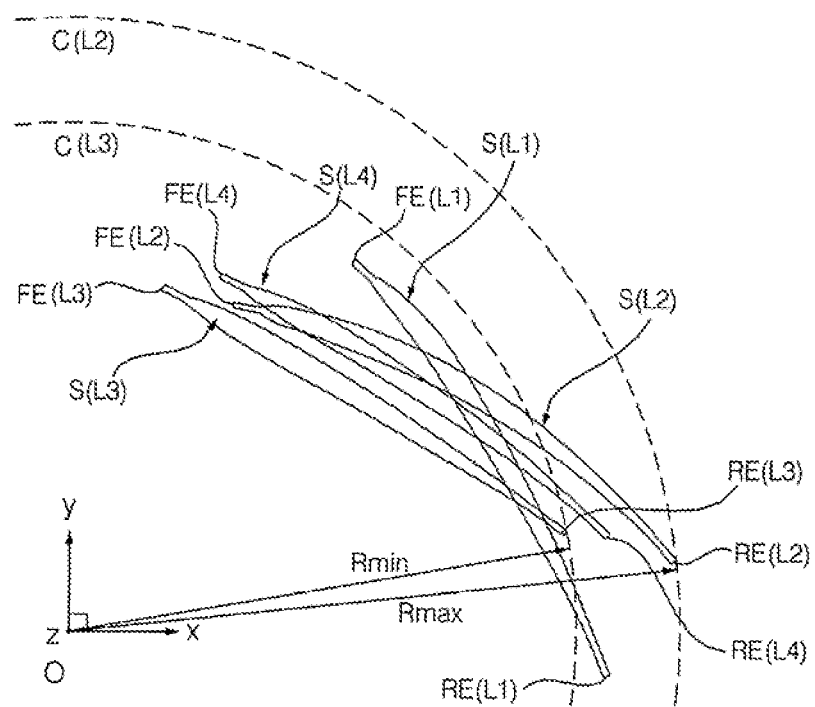
FIG. 5 is a view showing the cross sections of FIGS. 4A-4B projected onto a single plane in a direction of a rotational axis.
Figure 6:
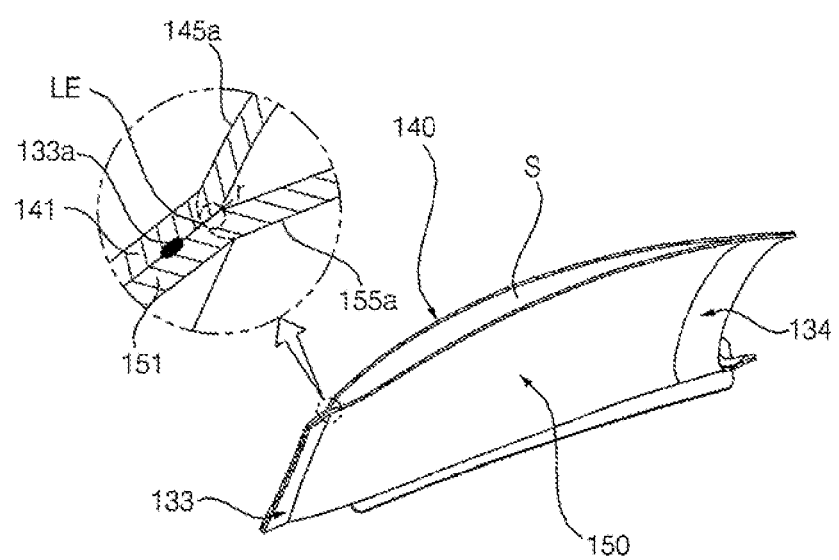
FIG. 6 is a longitudinal sectional view of the blade.

FIG. 2 is a perspective view showing a centrifugal fan according to one embodiment. FIG. 3 is an exploded perspective view of the centrifugal fan shown in FIG. 2. FIGS. 4A-4B are a view showing positions of layers marked at the blade and cross sections of the blade taken at the layers, respectively. FIG. 5 is a view showing the cross sections of FIG. 4 projected onto a single plane in as direction of a rotation axis. FIG. 6 is a longitudinal sectional view of the blade.

Referring to FIGS. 2 to 6, the centrifugal fan 100 according to one embodiment includes a main plate 110, a shroud 120, and a plurality of blades 130. The main plate 110, the shroud 120, and the plurality of blades 130 may be formed of a metal having plasticity, preferably, steel.

The main plate 110 is rotated about a rotational axis O by a motor (4, see FIG. 1). Although the main plate 110 may be directly coupled to the rotational shaft of the motor according to an embodiment, the centrifugal fan 100 may further include a hub 160 configured to couple the main plate 110 and the rotational shaft of the motor to each other.

The shroud 120 is spaced apart from the main plate 110 and has a suction opening 121 through which air is introduced in a direction of the rotational axis O. The shroud 120 takes the form of a ring centrally defining the suction opening 121. A diameter of the shroud 120 gradually increases in a radial direction from an inner circumference of the shroud 120 defining the suction opening 121 and has a maximum value at an outer circumference of the shroud 120 from which an air stream pumped by the blades 130 is discharged. The shroud 120 may have a curved inner surface along which air is guided, the curved inner surface of the shroud being convex toward the main plate 110.

The plurality of blades 130 is arranged in a circumferential direction between the main plate 110 and the shroud 120. Air suctioned through the suction opening 121 of the shroud 120 is moved from a front edge to a rear edge of the respective blades 130 to thereby be discharged outward. The centrifugal fan 100 may include seven blades 130 although this is not essential.

The main plate 110 may include a blade support plate portion 111 that supports lower edges of the blades 130, and a center hub mounting portion 112 that extends from the blade support plate portion 111 toward the shroud 120. The hub mounting portion 112 is curved by a predetermined curvature. The hub mounting portion 112 is centrally provided with a mounting opening 110a for installation of the hub (not shown) to be coupled to the rotational shaft of the motor and a plurality of first fastening holes 110b arranged at a constant interval in a circumferential direction around the mounting opening 110a. As fastening members, such as screws, bolts or the like, are fastened through the first fastening holes 110b, the hub may be fixed.

Referring to FIGS. 3 and 4A-4B, in the following description, a portion of the blade 130 at which an air stream suctioned through the shroud 120 begins to come into contact with the blade 130 is referred to as a front edge FE, and a portion of the blade 130 at which the air stream is separated from the blade 130 is referred to as a rear edge RE. Considering arbitrary layers (or planes) perpendicular to the rotational axis O, cross sections of the blade 130 taken at the respective layers have front edges FE located on a predetermined common inner circumference and rear edges RE located on a predetermined common outer circumference, the common outer circumference having a greater diameter than that of the common inner circumference. Assuming that one surface of the blade 130 facing the outer side of the centrifugal fan 100 is referred to as a positive pressure surface 131 and the other surface of the blade facing the inner side of the centrifugal fan 100 opposite to the positive pressure surface 131 is a negative pressure surface 132, the front edge FE of the blade 130 is located in front of the rear edge RE in a direction facing the positive pressure surface 131 (or in a rotational direction of the centrifugal fan 100).

The blade 130 includes a positive pressure surface forming member 140 that forms the positive pressure surface (131, see FIG. 2), and a negative pressure surface forming member 150 that forms the negative pressure surface (132 see FIG. 2). The positive pressure surface forming member 140 and the negative pressure surface forming member 150 may be coupled to each other with a space S therebetween. An entire region of the positive pressure surface 131 may be defined by the positive pressure surface forming member 140 and an entire region of the negative pressure surface 132 may be defined by the negative pressure surface forming member 150. The positive pressure surface forming member 140 and the negative pressure surface forming member 150 may be formed by processing a metal sheet. The positive pressure surface forming member 140 (or the negative pressure surface forming member 150) may be formed by processing a metal sheet having an even thickness. In particular, the positive pressure surface forming member 140 or the negative pressure surface forming member 150 may achieve sufficient rigidity with a thickness of approximately 1 mm, which is half or more of a conventional blade formed of a metal sheet having a thickness of 2 mm or more.

More specifically, the positive pressure surface forming member 140 and the negative pressure surface forming member 150 may be fabricated by pressing a metal sheet having plasticity. More particularly, a steel sheet has high plasticity and is easily formed in various shapes and may achieve sufficient corrosion resistance, heat resistance, rigidity and the like according to a content ratio of carbon (C), chrome (Cr), Nickel (Ni) and the like. In particular, a steel centrifugal fan may achieve enhanced rigidity, and thus, is rotatable at a higher rpm than a conventional resin centrifugal fan. The conventional resin centrifugal fan ensures easy formation of a blade having a complicated shape, but has low rigidity. In particular, when the resin centrifugal fan is applied to a large product, the fan may be problematic in terms of stability because of a high risk of damage to blades due to high external static pressure. On the contrary, according to embodiments, as the blade is constructed using the two metal members 140 and 150, it is possible to achieve sufficient rigidity and to provide the blade with a complicated shape for enhanced performance of the fan.

The positive pressure surface forming member 140 and the negative pressure surface forming member 150 may be bonded to each other at the front edge and the rear edge of the blade 130. Bonding between the positive pressure surface forming member 140 and the negative pressure surface forming member 150 may be implemented at rear surfaces of the respective members. In the following description, a portion of the front edge of the blade 130 where bonding between the positive pressure surface forming member 140 and the negative pressure surface forming member 150 is implemented is referred to as a front edge bonding portion 133 and a portion of the rear edge of the blade 130 where bonding between the positive pressure surface forming member 140 and the negative pressure surface forming member 150 is implemented is referred to as a rear edge bonding portion 134. In addition, the blade 130 has a main body portion 135 between the front edge bonding portion 133 and the rear edge bonding portion 134 and the main body portion 135 inwardly defines a space S. In particular, the main body portion 135 may have an enclosed cross section that surrounds the space S.

The positive pressure surface forming member 140 is provided at a front edge thereof with a first front edge bonding surface portion 141 and at a rear edge thereof with a first rear edge bonding surface portion 142. The positive pressure surface forming member is further provided with a first curved surface portion 145 between the first front edge bonding surface portion 141 and the second rear edge bonding surface portion 142. Similarly, the negative pressure surface forming member 150 is provided at a front edge thereof with a second front edge bonding surface portion 151 and at a rear edge thereof with a second rear edge bonding surface portion 152. The negative pressure surface forming member 150 is further provided with a second curved surface portion 155 between the second front edge bonding surface portion 151 and the second rear edge bonding surface portion 152.

Bonding between the first front edge bonding surface portion 141 and the second front edge bonding surface portion 151 is implemented at the front edge bonding portion 133 of the blade 130, and bonding between the first rear edge bonding surface portion 142 and the second rear edge bonding surface portion 152 is implemented at the rear edge bonding portion 134.

A rear surface of the first front edge bonding surface portion 141 (hereinafter referred to as a first front edge bonding surface) and a rear surface of the second front edge bonding surface portion 151 (hereinafter referred to as a second front edge bonding surface) may come into surface contact with each other. The first front edge bonding surface portion 141 and the second front edge bonding surface portion 151 may include bonding surfaces having a corresponding shape. That is, the first front edge bonding surface and the second front edge bonding surface may have substantially a same shape so as to be bonded to each other in close contact.

Likewise, a rear surface of the first rear edge bonding surface portion 142 (hereinafter referred to as a first rear edge bonding surface) and a rear surface of the second rear edge bonding surface portion 152 (hereinafter referred to as a second rear edge bonding surface) may come into surface contact with each other. The first rear edge bonding surface portion 142 and the second rear edge bonding surface portion 152 may include bonding surfaces having a corresponding shape. That is, the first rear edge bonding surface and the second rear edge bonding surface may have substantially a same shape so as to be bonded to each other in close contact.

The main body portion 135 includes the first curved surface portion 145 and the second curved surface portion 155, and the space S is defined between the first curved surface portion 145 and the second curved surface portion 155. The space S has a transverse cross sectional shape defined by a rear surface of the first curved surface portion 145 and a rear surface of the second curved surface portion 155, and a top and bottom of the space is, respectively, defined by the shroud 120 and the main plate 110. The positive pressure surface forming member 140 and the negative pressure surface forming member 150 are independent of each other until they are bonded to each other, and therefore, may be freely processed into different shapes. Accordingly, the first curved surface portion 145 and the second curved surface portion 155 may be shaped to exhibit different curvature variations. In particular, since shapes of the first curved surface portion 145 and the second curved surface portion 155 determine a shape of the positive pressure surface 131 and a shape of the negative pressure surface 132, respectively, the fact that the shapes of the curved surface portions 145 and 155 are freely determined is very advantageous in terms of enhancement in the performance of the fan. In particular, it is possible to form a positive pressure surface or negative pressure surface including more complicated curved surfaces than that in a case in which a positive pressure surface and a negative pressure surface are formed by bending a single metal sheet (see Japanese Patent Laid-open Publication No. 2000-45997).

Bonding between the positive pressure surface forming member 140 and the negative pressure surface forming member 150 at the front edge bonding portion 133 or at the rear edge bonding portion 134 may be implemented by welding, more particularly, resistance welding or laser welding.

Resistance welding is welding that confines generation of resistance heat to a relative small specific portion by applying pressure to a welding position of a base metal and thereafter passing current therethrough. An example of resistance welding may include spot welding or projection welding. Although welding using a welding rod leaves a strip of corrugated fusion beads caused by melting a base metal and the welding rod, projection welding or spot welding has less formation of beads, thus having a less effect on balancing of the fan.

Laser welding exhibits considerably low heat input to a weld and a narrow heat influence range and leaves behind substantially no welding beads, although it requires relatively great cost, and therefore, enables very precise bonding between members. When the blade 130 is formed using laser welding, areas of the front edge bonding portion 133 and the rear edge bonding portion 134 may be remarkably reduced.

The blade 130 may include a shroud connection portion 136 connected to the shroud 120. The shroud connection portion 136 may include a shroud bonding surface portion 143 and/or a shroud bonding surface portion 153 bent from an upper edge of at least one of the positive pressure surface forming member 140 and the negative pressure surface forming member 150.

The positive pressure surface forming member 140 and the negative pressure surface forming member 150 may be, respectively, provided with the first shroud bonding surface portion 143 and the second shroud bonding surface portion 153. In a state in which the positive pressure surface forming member 140 and the negative pressure surface forming member 150 are bonded to each other, the first shroud bonding surface portion 143 and the second shroud bonding surface portion 153 are bent in opposite directions. The first shroud bonding surface portion 143 and the second shroud bonding surface portion 153 may be bonded to an inner circumferential surface of the shroud 120 by welding. Bonding surfaces of the first shroud bonding surface portion 143 and the second shroud bonding surface portion 153 to be bonded to the shroud 120 (hereinafter referred to as a first shroud bonding surface and a second shroud bonding surface) may be curved to correspond to a shape of the inner circumferential surface of the shroud 120 so as to come into close contact with the inner circumferential surface.

The blade 130 may include a main plate connection portion 137 connected to the main plate 110. The main plate connection portion 137 may include a main plate bonding surface portion 144 and/or a main plate bonding surface portion 154 bent from a lower edge of at least one of the positive pressure surface forming member 140 and the negative pressure surface forming member 150.

The positive pressure surface forming member 140 and the negative pressure surface forming member 150 may be, respectively, provided with the first main plate bonding surface portion 144 and the second main plate bonding surface portion 154. In a state in which the positive pressure surface forming member 140 and the negative pressure surface forming member 150 are bonded to each other, the first main plate bonding surface portion 144 and the second main plate bonding surface portion 154 are bent in opposite directions. The first main plate bonding surface portion 144 and the second main plate bonding surface portion 154 may be bonded to the main plate 110 by welding. Bonding surfaces of the first main plate bonding surface portion 144 and the second main plate bonding surface portion 154 to be bonded to the main plate 110 (hereinafter referred to as a first main plate bonding surface and a second main plate bonding surface) come into close contact with the main plate 110.

Bonding between the shroud bonding surface portions 143 and 153 and the shroud 120, or bonding between the main plate bonding surface portions 144 and 154 and the main plate 110 may be implemented by welding, more particularly resistance welding or laser welding. Resistance welding and laser welding have been described above, and thus, a further description thereof will be omitted hereinafter.

Referring to FIGS. 4 to 6, the blade 130 may have a three dimensional (3D) shape. In the following description, the 3D shape of the blade is defined as a shape in which, when cross sections of the blade taken at predetermined layers corresponding to predetermined planes perpendicular to the rotational axis O are projected onto a predetermined projection plane in a direction of the rotational axis O, two or more lines among lines interconnecting the front edges FE and the rear edges RE of the respective cross sections in the projection plane are not a same line (or do not overlap each other). Here, the lines interconnecting the front edges and the rear edges are defined according to given rules. For example, the lines may be straight lines interconnecting the front edges FE and the rear edges RE. Alternatively, the lines may be lines connecting equidistant points from the positive pressure surface 131 and the negative pressure surface 132.

In a region of the blade 130 defining the space 5, a cross section of the blade may have an airfoil shape. The main body portion 135 defines an airfoil. An entire cross section of an inner circumferential surface of the blade defining the space S has an airfoil shape, but a front edge of the cross section may have a cusp due to bonding between the positive pressure surface forming member 140 and the negative pressure surface forming member 150. Therefore, "airfoil" is defined based on the shape of an outer circumferential surface of the blade 130, and a leading edge LE is defined as being located on a virtual curve that interconnects an outer circumferential surface of the positive pressure surface forming member 140 and an outer circumferential surface of the negative pressure surface forming member 150. In the drawings, "r" designates a radius of curvature at the leading edge LE, and a radius of curvature at an upper surface or a lower surface of the airfoil has a minimum value at the leading edge LE.

Hereinafter, the main body portion 135 will be described in more detail. The main body portion 135 may have an airfoil or streamlined shape inwardly defining the space S. According to the definition proposed by the National Advisory Committee for Aeronautics (NACA), "airfoil" is configured by a leading edge, a trailing edge, and an upper surface 145*a* and a lower surface 155*a* that connect the leading edge and the trailing edge to each other, and a shape of the airfoil is determined by various factors. Examples of the factors include a chord line CRL that is a straight line connecting the leading edge and the trailing edge to each other, and a camber line CBL that is acquired by connecting equidistant points from the upper surface and the lower surface between the leading edge and the trailing edge.

In FIGS. 4A-4B, four layers perpendicular to the rotational axis O are shown. Cross sections S(L1), S(L2), S(L3) and S(L4) of the blade 130 are, respectively, taken at a first layer Layer 1, a second layer Layer 2, a third layer Layer 3, and a fourth layer Layer 4. The first layer Layer 1, the second layer Layer 2, the third layer Layer 3, and the fourth layer Layer 4, which are required to define the shape of the blade 130, may be freely selected so long as they are taken from a top to a bottom along the rotational axis O in this sequence.

The entire blade 130 acquires a twisted shape in a vertical direction via interrelation between the first cross section S(L1) and the fourth cross section S(L4), in the case of the blade included in the conventional centrifugal fan as exemplarily shown in FIG. 12, or as disclosed in Japanese Patent Laid-open Publication No. 2000-45997, a cross section of the blade near a shroud and a cross section of the blade near a main plate have substantially a same shape, and thus, the centrifugal fan could not effectively deal with variation of airflow from the shroud to the main plate. On the other hand, the centrifugal fan 100 of this embodiment may be designed in such a manner that the first cross section S(L1) taken at the first layer Layer 1 is suitable for flow characteristics at the shroud 120, and the fourth cross section S(L4) taken at the fourth layer Layer 4 is suitable for flow characteristics at the main plate 110 independently of the first cross section S(L1). This has the effect of remarkably improving performance, more particularly, efficiency of the fan as compared to the related art.

A front edge FE(L1) of the first cross section S(L1) close to the shroud 120 may be farther from the rotational axis O than a front edge FE(L4) of the fourth cross section S(L4) close to the main plate 110, and a rear edge RE(L4) of the fourth cross section S(L4) may be farther from the rotational axis O than a rear edge RE(L1) of the first cross section S(L1). In this case, as exemplarily shown in FIG. 5, chord lines of the first cross section S(L1) and the fourth cross section S(L4) cross each other. The chord line of the first cross section S(L1) may cross chord lines of a second cross section S(L2) and a third cross section S(L3), as well as the chord line of the fourth cross section S(L4).

Meanwhile, as exemplarily shown in FIG. 4A, when viewing the blade 130 from a lateral side, the front edge FE or the rear edge RE of the blade 130 has a predetermined inclination angle with respect to the rotational axis O, and more particularly, an upper edge of the blade close to the shroud 120 is located farther from the rotational axis O than a lower edge of the blade close to the main plate 110. Since air velocity is increased with decreasing distance to the shroud 120, a portion of the blade 130 closer to the shroud 120 must generate greater force. In this way, at least a portion of the blade 130 is shaped such that a cross section of the blade 130 taken at a layer closer to the shroud 120 is located farther from the rotational axis O, and this shape increases a linear velocity of the blade 130 at a layer closer to the shroud 120, which allows a corresponding portion of the blade 130 to generate a greater force.

In addition, generally, as air velocity is faster at a portion of the blade closer to the shroud 120 (hereinafter, the first layer Layer 1 being described by way of example), flow inertia (more particularly, an inertial component in a direction of the rotational axis O) is greater at the first layer Layer 1 and this may cause flow separation at the rear edge of the cross section of the blade taken at the first layer. To solve this problem, the blade 130 according to this embodiment is configured in such a manner that the front edge FE(S1) of the first cross section S(L1) becomes farther from the rotational axis O than in the related art, which increases a flow path from the suction opening 121 of the shroud 120 to the rear edge RE(L4) of the first cross section S(L1) beyond that in the related art, thereby causing air to overcome flow inertia and be smoothly guided to the rear edge RE(L4). This has the effect of more efficiently restricting flow separation at the rear edge RE of the blade 130.

In addition, the blade 130 may be configured in such a manner that the first cross section S(L1) is located ahead of the fourth cross section S(L4) in a direction opposite to a rotational direction of the main plate 110. More particularly, at least a portion of the rear edge RE of the blade 130 is more deviated in a direction opposite to a rotational direction of the main plate 110 at an upper edge thereof close to the shroud 120 than at a lower edge thereof close to the main plate 110. As described above, even if the blade 130 is shaped in such a manner that a portion of the blade closer to the shroud 120 (for example, the first cross section S(L1)) is farther from the rotational axis O than another portion of the blade (for example, the fourth cross section SL(4)), in the same example, the rear edge RE(L1) of the first cross section S(L1) is located ahead of the rear edge RE(L4) of the fourth cross section S(L4) in a direction opposite to the rotational direction of the main plate 110. Therefore, the rear edge RE(L1) of the first cross section S(L1) is located closer to the rotational axis O than the front edge FE(L1). This has the effect of substantially restricting increase in a blowing diameter of the blade 130 (i.e. a maximum distance from the rotational axis O to the rear edge LE of the blade 130). The rear edge RE(L1) of the first cross section may be located ahead of the rear edge RE(L4) of the fourth cross section in a direction opposite to the rotational direction of the main plate 110, and the rear edge RE(L1) of the first cross section among the rear edges RE(L1), RE(L2), RE(L3), and RE(L4) of the respective cross sections located at a foremost position in a direction opposite to the rotational direction of the main plate 110. This tendency may be equally applied to the front edge FE of the blade 130, and more particularly, the front edge FE(L1) of the first cross section among the front edges FE(L1), FE(L2), FE(L3), and FE(L4) of the respective cross sections of the blade 130 may be located at a foremost position in a direction opposite to the rotational direction of the main plate 110.

Meanwhile, the front edge FE(L3) of the third cross section may be located ahead of the front edge FE(L4) of the fourth cross section in the rotational direction of the main plate 110. This tendency may be equally applied to the rear edge RE. In this case, the rear edge RE(L3) of the third cross section of the blade 130 may be located ahead of the rear edge RE(L4) of the fourth cross section in the rotational direction of the main plate 110.

Figure 7:
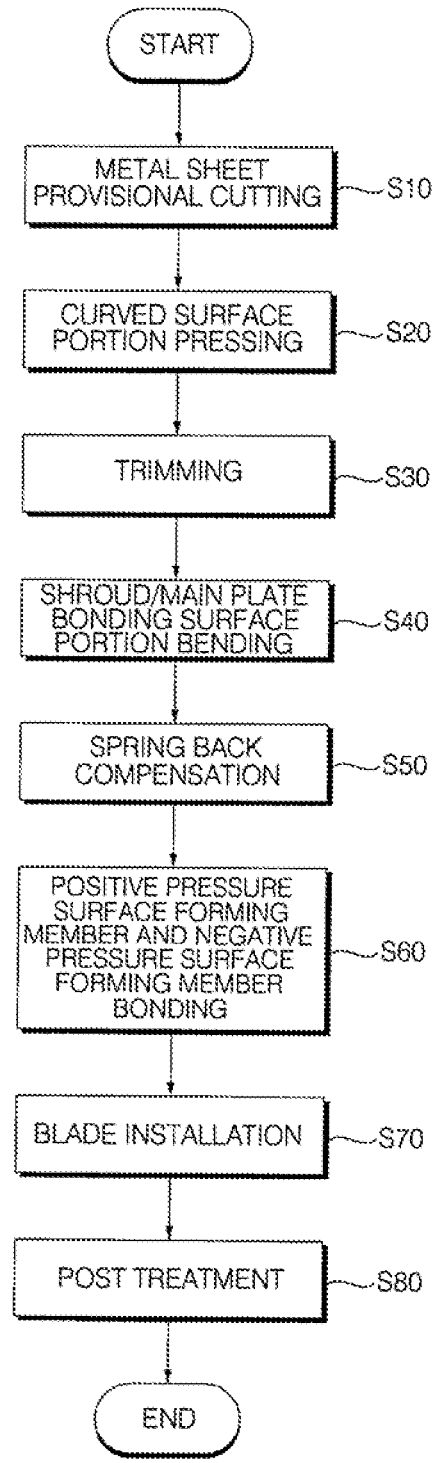
FIG. 7 is a flowchart showing a method of a manufacturing a centrifugal fan according to one embodiment.
Figure 8:
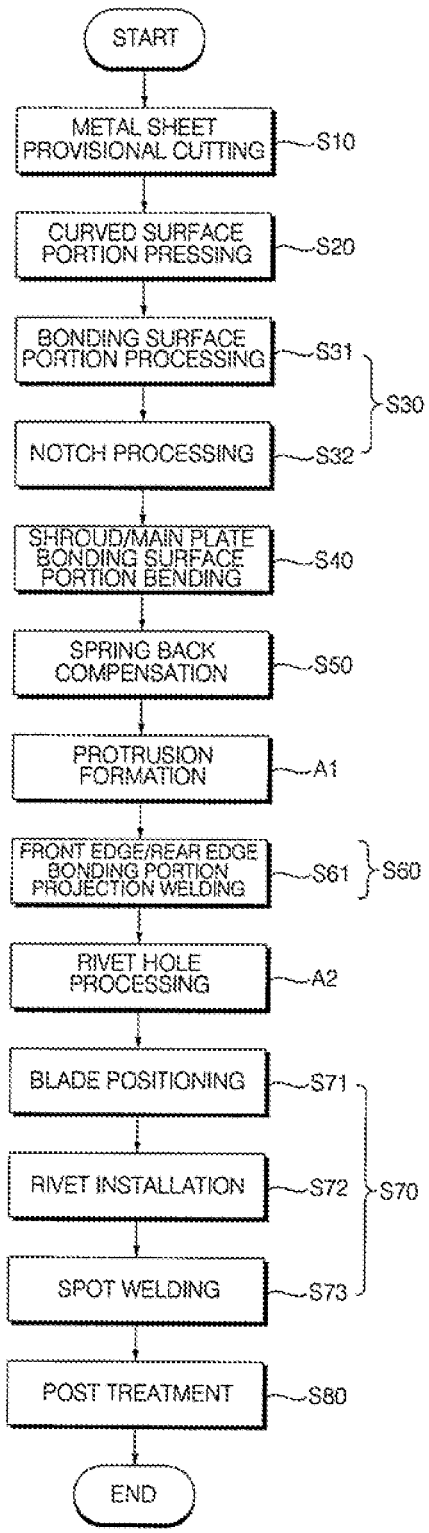
FIG. 8 is a flowchart showing a method of a manufacturing a centrifugal fan according to another embodiment.

FIG. 7 is a flowchart showing a method of a manufacturing a centrifugal fan according to one embodiment. FIG. 8 is a flowchart showing a method of manufacturing a centrifugal fan according to another embodiment. FIGS. 9A to 9I are views showing a manufacture sequence of centrifugal fan according to embodiments.

The method of manufacturing a centrifugal fan according to embodiments includes cutting a metal sheet to form a positive pressure surface forming member and a negative pressure surface forming member which, respectively, configure a positive pressure surface and a negative pressure surface; pressing the positive pressure surface forming member and the negative pressure surface forming member to form a first curved surface portion configuring the positive pressure surface and a second curved surface portion configuring the negative pressure surface; trimming the positive pressure surface forming member provided with the first curved surface portion and the negative pressure surface forming member provided with the second curved surface portion to form a shroud bonding surface portion and a main plate bonding surface portion; bending the shroud bonding surface portion and the main plate bonding surface portion; bonding the positive pressure surface forming member and the negative pressure surface forming member to each other; and bonding the shroud bonding surface portion to a shroud and bonding the main plate bonding surface portion to a main plate in a bonded state of the positive pressure surface forming member and the negative pressure surface forming member.

Referring to FIGS. 7 to 9, the centrifugal fan 100 may be manufactured by the following steps.

(1) Metal Sheet Provisional Cutting Step S10: A metal sheet 210 is cut to form each of the positive pressure surface forming member 140 that configures the positive pressure surface 131 and the negative pressure surface forming member 150 that configures the negative pressure surface 132. The metal sheet has plasticity suitable for pressing, as well as cutting, and may be a steel sheet. In this step, the positive pressure surface forming member 140 and the negative pressure surface forming member 150 are provisionally cut to a size having a margin as compared to a final shape. For example, the metal sheet 210 may be cut in a given shape as designated by reference numeral 211 in FIG. 9A, and the cut shape 211 may have a difference between that of the positive pressure surface forming member 140 and that of the negative pressure surface forming member 150.

(2) Curved Surface Portion Pressing Step S20: The curved surface portions 145 and 155 are, respectively, acquired by forming the metal sheet 211 provisionally cut, in Step S10. The curved surface portions 145 and 155 may be formed by pressing. The metal sheet 211 is placed between an upper mold 220 and a lower mold 230, which are designed based on a desired blade shape, and the upper mold 220 is pushed (see FIG. 9B). The curved surface portions 145 and 155 may be formed in a partial region of the metal sheet 211, and the front edge bonding surface portions 141 and 151 and the rear edge bonding surface portions 142 and 152 may be formed at the front and rear sides of the curved surface portions 145 and 155. Although not shown in the drawing, the shroud bonding surface portions 143 and 153 and the main plate bonding surface portions 144 and 154 may be simultaneously formed. In particular, in this step, the first curved surface portion 145 of the positive pressure surface forming member 140 and the second curved surface portion 155 of the negative pressure surface forming member 150 may have different shapes of curved surfaces according to the shape of molds used. Pressing has the effect of providing a material with increased strength and reduced ductility.

(3) Trimming Step S30: Trimming to remove an extra portion of the metal sheet 211 having the curved surface portions 145 and 155 is implemented, such that the metal sheet 211 has a size conforming to design dimensions of the final shape of the positive pressure surface forming member 140 and the negative pressure surface forming member 150. In particular, in this step, the front edge bonding surface portion 141 or 151 and the rear edge bonding surface portion 142 or 152 may be processed, respectively, at a front edge and a rear edge of the metal sheet 211, and the shroud bonding surface portion 143 or 153 and the main plate bonding surface portion 144 or 154 may be processed, respectively, at an upper edge and a lower edge of the metal sheet 211, in Step S31. As exemplarily shown in FIG. 9C, four corners of the metal sheet 211 may be cut away to permit independent bending of the bonding surface portions 143, 153, 144, and 154 without interference with the front edge bonding surface portions 141 and 151 or the rear edge bonding surface portions 142 and 152, in Step S40.

In addition. Step S30 may further include processing notches 185 in front and rear edges of the shroud bonding surface portions 143 and 153 and in front and rear edges of the main plate bonding surface portions 144 and 154, in Step S32. Smooth bending of the shroud bonding surface portions 143 and 153 or the main plate bonding surface portions 144 and 154 about the notches 185 is possible, which allows the bonding surface portions 143, 153, 144, and 154 to be processed in an accurate shape. In addition, it is possible to prevent deformation of the curved surface portions 145 and 155 because stress is concentrated at the notches 185 upon bending of the bonding surface portions 143, 153, 144, and 154.

Figure 9A:
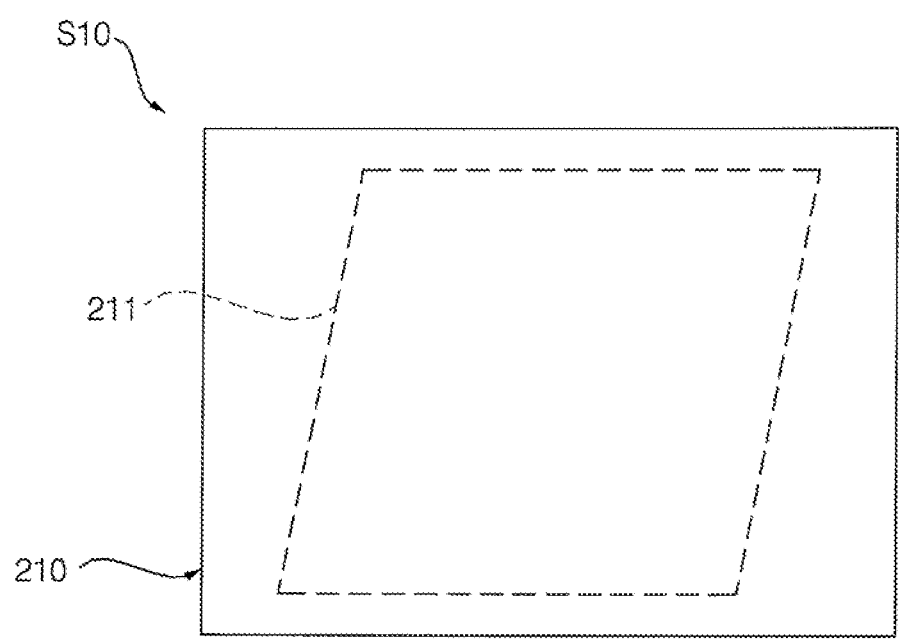
Figure 9B:
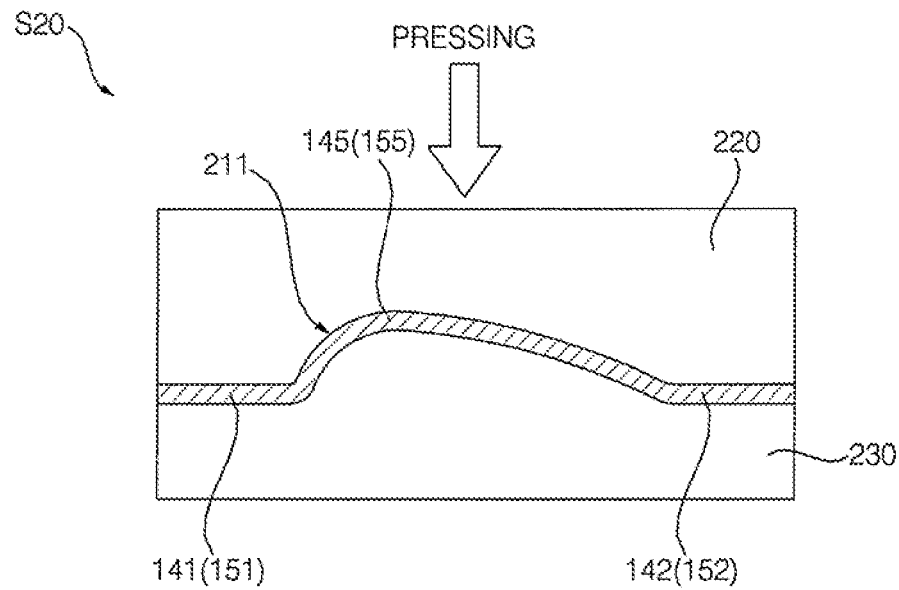
Figure 9C:
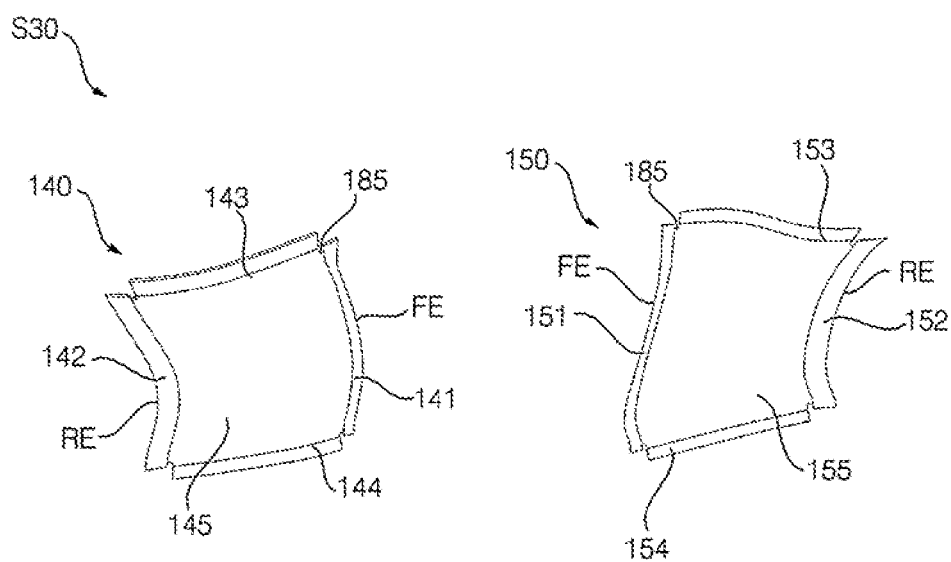
Figure 9D:
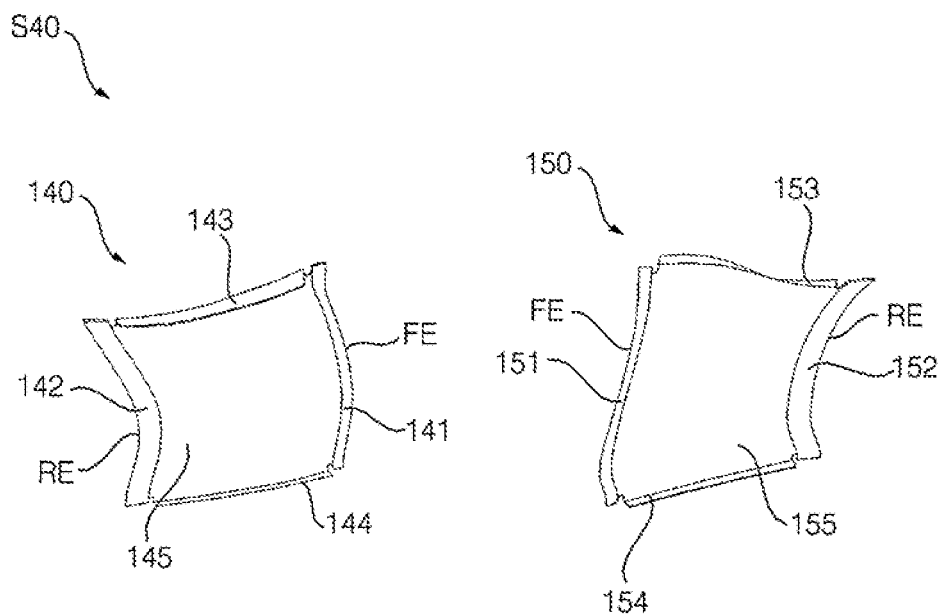
Figure 9E:
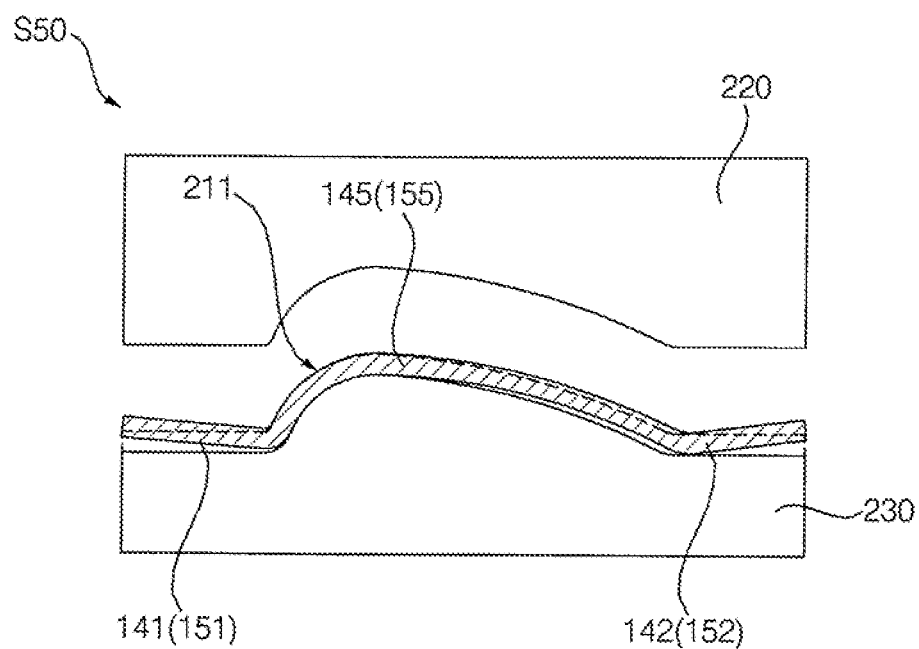

(4) Bonding Surface Portion Bending Step S40: after completion of trimming in Step S30, at least one of the positive pressure surface forming member 140 and the negative pressure surface forming member 150 is subjected to bending of the shroud bonding surface portion 143 and/or the shroud bonding surface portion 153 formed at the upper edge of the metal sheet 211, and bending of the main plate bonding surface portion 144 and/or the main plate bonding surface portion 154 formed at the lower edge of the metal sheet 211 (see FIG. 9D).

(5) Spring Back Compensation Step S50: Spring back refers to reduction of a bending rate caused when a plastic material subjected to bending is elastically returned to an original state thereof upon removal of pressure. Through this spring back, during bending of the shroud bonding surface portions 143 and 153 or the main plate bonding surface portions 144 and 154, in Step S40, the bonding surface portions 143, 153, 144 and 154, as well as the portions processed in the previous steps, i.e. the front edge and rear edge bonding surface portions 141, 151, 142 and 152 or the curved surface portions 144 and 155 tend to return to the original state thereof. For reference, FIG. 9E with regard to Step S50 shows that the metal sheet 211 to be processed as designated by a dotted line is deformed by spring back as designated by a solid line.

Step S50 is implemented to compensate for a bending rate reduced by spring back, and molding is again implemented using the molds 220 and 230. Step S50 serves to cause a material to pass a yield point and maintain a processed shape thereof even after removal of external force, and may be repeatedly implemented a plurality of times according to a deformation degree of the material.

(6) Bonding Step S60 of Positive Pressure Surface Forming Member 140 and Negative Pressure Surface Forming Member 150: The positive pressure surface forming member 140 and the negative pressure surface forming member 150, which have been completely processed in the previous steps, are bonded to each other. Then, the front edge bonding surface portions 141 and 151 may be bonded to each other at the respective front edges of the positive pressure surface forming member 140 and the negative pressure surface forming member 150, and likewise, the rear edge bonding surface portions 142 and 152 may be bonded to each other at the respective rear edges. In a state in which the front edge bonding surface portions 141 and 151 of both the members 140 and 150 come into contact with each other, and the rear edge bonding surface portions 142 and 152 come into contact with each other, bonding may be implemented by welding. Bonding between the front edge bonding surface portions 141 and 151, or bonding between the rear edge bonding surface portions 142 and 152 may be implemented by projection welding, in Step S61, without being limited thereto, and as described above, other resistance welding, such as spot welding, or laser welding is possible.

Upon implementation of projection welding, in Step S61, providing the positive pressure surface forming member 140 or the negative pressure surface forming member 150 with protrusions for welding (A1) may be further implemented. Protrusions 141a may be formed at a plurality of points, aligned in a line from the shroud 120 to the main plate 110, at the front edge bonding surface portion 141 or 151 or the rear edge bonding surface portion 142 or 152.

Figure 9F:
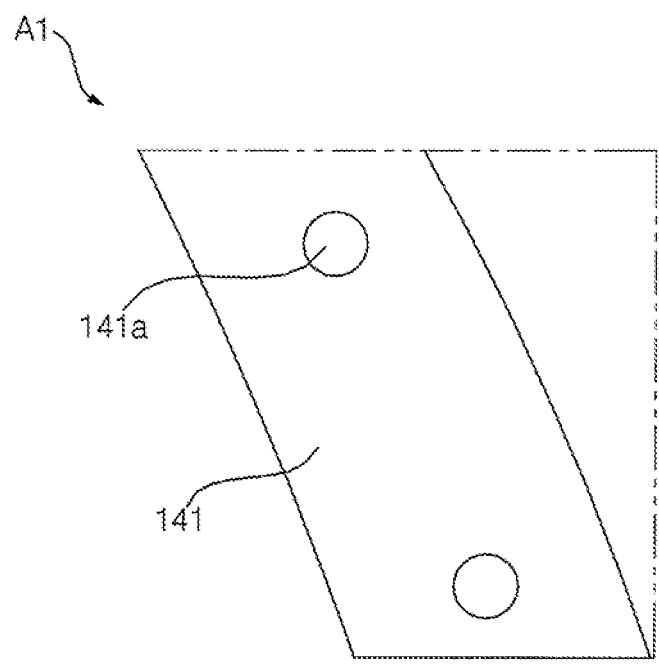
Figure 9H:
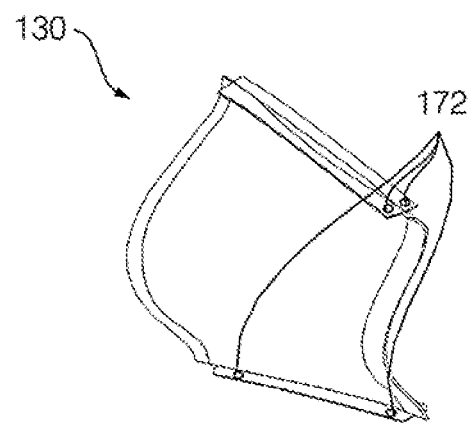

Although FIG. 9F shows that the protrusions 141a are formed in a vertical direction along the front edge bonding surface portion 141 of the positive pressure surface forming member 140, embodiments are not limited thereto, and the protrusions 141a may be further formed at the rear edge bonding surface portion 142. Likewise, protrusions may be further formed at the negative pressure surface forming member 150.

In addition, although the embodiment describes that formation of the protrusions 141a is implemented after Step S50 by way of example, embodiments are not limited thereto, and Step A1 may be implemented at an appropriate point in time before Step S60.

Meanwhile, the projection welding of Step S61 (see FIG. 9G) may include simultaneously melting the plurality of protrusions 141a. According to embodiments, current may be applied to the plurality of protrusions 141a using a single electrode, or current may be simultaneously applied to the respective protrusions 141a using a plurality of electrodes. This has the effect of shortening a bonding process.

In Step S60, as another example of resistance welding, spot welding may be implemented. In this case, in a same manner as the projection welding, spot welding may be implemented at a plurality of points aligned in a line from the shroud 120 to the main plate 110 at the front edge bonding surface portion 141 or 151 or the rear edge bonding surface portion 142 or 152.

Resistance welding, such as spot welding or projection welding, as exemplarily shown in FIG. 6, causes only a limited portion of a base material coming into contact with an electrode to be molten. Therefore, marks caused when the molten base material is solidified, that is nuggets 133a are formed at a constant interval on the bonding portions 133 and 134. These nuggets 133a may be arranged in a vertical direction on the bonding portions 133 and 134.

(7) Blade Installation Step S70: The blade 130, in the form of an integrated member acquired by bonding, in Step S60, is coupled to the main plate 110 and the shroud 120. Coupling between the blade 130 and the main plate 110, or coupling between the blade 130 and the shroud 120 may be implemented by resistance welding or laser welding. These welding methods have been described above, and thus, will not be repeatedly described.

According to an embodiment, Step S70 may include a blade positioning, Step S71, a blade provisional assembly, Step S72 and a resistance welding, Step S73.

In the blade positioning, Step S71, the blade 130 is positioned at a predetermined assembly position on the main plate 110.

In the blade provisional assembly, Step S72, the blade 130 is provisionally assembled using fastening members, such as bolts, screws, rivets or the like. Hereinafter, provisional assembly using the rivets 171 will be described by way of example.

Prior to Step S72, processing holes 172 for insertion of the rivets in at least one of the positive pressure surface forming member 140 and the negative pressure surface forming member 150 may be further implemented. As the rivets are inserted into the holes 172, the shroud 120 and the shroud bonding surface portions 143 and 153 may be fastened to each other, and likewise, the main plate 110 and the main plate bonding surface portions 144 and 154 may be fastened to each other. Processing positions of the holes 172, as exemplarily shown in FIG. 9H, may include at least two positions of a front end and a rear end of the main plate bonding surface portion 144 or 154 and at least one position of a rear end of the shroud bonding surface portion 143 or 153. Here, note that the hole 172 for insertion of the rivet 171 may further be processed in a front end of the shroud bonding surface portion 143 or 153 based on a size of the centrifugal fan 100.

Figure 9I:
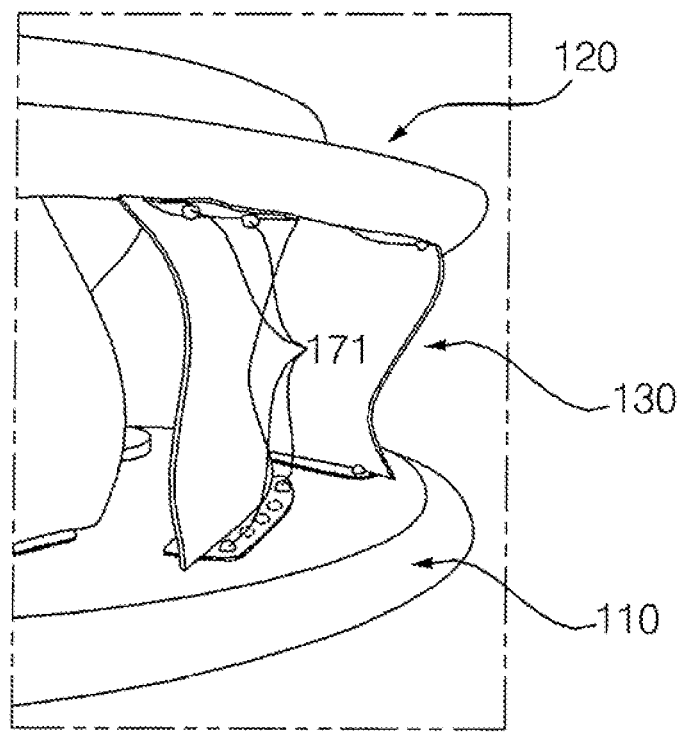

Each bonding surface portion 143, 153, 144, or 154 may be spot welded to an object (the shroud 120 or the main plate 110) at a predetermined interval in a portion thereof between the front end and the rear end thereof except for the fastening positions of the rivets 171. FIG. 9I shows the rivets 171. As will be appreciated from the drawing, the rivets 171 are fastened at two positions of the rear end of the shroud bonding surface portion 143 or 153, and the rivets 171 are respectively fastened at the front end and the rear end of the main plate bonding surface portion 144 or 154. However, installation positions of the rivets 171 are not limited thereto and may be changed in various ways according to a size of the fan 100 or a shape of the shroud 120.

After Step S71, a step of bonding the blade 130 to the shroud 120 or the main plate 110 may be implemented. This bonding may be implemented by resistance welding or laser welding. Step S72 is one example of resistance welding, and the blade 130 is bonded to the shroud 120 and the main plate 110 by spot welding. Spot welding may be implemented at a plurality of points between the front edge to the rear edge on the shroud bonding surface portions 143 and 153 or the main plate bonding surface portions 144 and 154.

Spot welding leaves indentations or welding beads in a surface of a base metal. Since the welding beads are formed in a significantly confined range due to the characteristics of spot welding, and thus, cause less flow resistance and no increase in weight of a base metal, the welding beads have substantially no negative effect on balancing of the fan.

(8) Post Treatment Step S80: This is a step for post treatment of a surface of the centrifugal fan 100 after completion of assembly of the main plate 110, the shroud 120 and the blade 130. Paint may be applied to the surface. In this case, a paint layer may increase corrosion resistance and seal coupling regions between members.

The invention claimed is:

1. A method of manufacturing a centrifugal fan, the method comprising:
   cutting a first metal sheet to form a positive pressure surface forming member forming a positive pressure surface, the positive pressure surface forming member configuring an entire of the positive pressure surface;
   cutting a second metal sheet, which is distinct from the first metal sheet, to form a negative pressure surface forming member forming a negative pressure surface, the negative pressure surface forming member configuring an entire of the negative pressure surface;
   pressing the positive pressure surface forming member and the negative pressure surface forming member to form a first curved surface forming the positive pressure surface and a second curved surface forming the negative pressure surface;
   trimming the positive pressure surface forming member and the negative pressure surface forming member to form a shroud bonding surface and a main plate bonding surface;
   bending the shroud bonding surface and the main plate bonding surface;
   bonding the positive pressure surface forming member and the negative pressure surface forming member to each other; and
   bonding the shroud bonding surface and a shroud to each other and bonding the main plate bonding surface and a main plate to each other in a bonded state of the positive pressure surface forming member and the negative pressure surface forming member, wherein the bonding of the positive pressure surface forming member and the negative pressure surface forming member to each other includes:
      bonding front edges of the positive pressure surface forming member and the negative pressure surface forming member to each other; and
      bonding rear edges of the positive pressure surface forming member and the negative pressure surface forming member to each other, wherein the front edges of the positive pressure surface forming member and the negative pressure surface forming member are formed to be in a same shape and the rear edges of the positive pressure surface forming member and the negative pressure surface forming member are formed to be in a same shape, wherein the trimming is implemented such that an upper edge and a lower edge of each of the positive pressure surface forming member and the negative pressure surface forming member are bent independently of the front edge of each of the positive pressure surface forming member and the negative pressure surface forming member in the bending, and wherein the shroud bonding surfaces of the positive pressure surface forming member and the negative pressure surface forming member are bent in an opposite direction and bonded on an inner surface of the shroud, and the main plate bonding surfaces of the positive pressure surface forming member and the negative pressure surface forming member are bent in an opposite direction and bonded on an inner surface of the main plate.

2. The method according to claim 1, wherein the first curved surface and the second curved surface define different shapes of curved surfaces.

3. The method according to claim 1, wherein at least one of the bonding between the front edges or the bonding between the rear edges is implemented by resistance welding.

4. The method according to claim 3, wherein the resistance welding is implemented at a plurality of positions aligned along a line from the shroud to the main plate in a state in which the front edges or the rear edges come into contact with each other.

5. The method according to claim 4, wherein the resistance welding comprises spot welding.

6. The method according to claim 4, wherein the resistance welding comprises projection welding, and wherein the method further comprises forming protrusions at any one of the positive pressure surface forming member or the negative pressure surface forming member so as to protrude toward the other one.

7. The method according to claim 6, wherein the forming protrusions includes forming the protrusions at a plurality of positions, aligned along the line from the shroud to the main plate, on at least one of the front edge or the rear edge of any one of the positive pressure surface forming member or the negative pressure surface forming member.

8. The method according to claim 7, wherein the bonding of the positive pressure surface forming member and the negative pressure surface forming member to each other includes simultaneously melting the protrusions.

9. The method according to claim 1, further comprising:
processing a rivet hole in at least one of the shroud bonding surface or the main plate bonding surface, wherein the bonding of the shroud bonding surface and the shroud to each other and the bonding the main plate bonding surface and the main plate to each other in the bonded state of the positive pressure surface forming member and the negative pressure surface forming member includes fastening a rivet through the rivet hole to couple at least one of the shroud bonding surface or the main plate bonding surface to the shroud or the main plate, respectively.

10. The method according to claim 9, wherein the bonding of the shroud bonding surface and the shroud to each other and the bonding the main plate bonding surface and the main plate to each other in the bonded state of the positive pressure surface forming member and the negative pressure surface forming member includes bonding each of the shroud bonding surface and the main plate bonding surface to the shroud or the main plate.

11. The method according to claim 10, wherein the bonding between the shroud bonding surface and the shroud, or the bonding between the main plate bonding surface and the main plate is implemented by resistance welding.

12. The method according to claim 11, wherein the resistance welding comprises spot welding implemented at a plurality of positions aligned along a line from the front edge to the rear edge of each of the positive pressure surface forming member and the negative pressure surface forming member.

13. The method according to claim 1, further comprising repeatedly implementing the pressing step after the bending step.

14. The method according to claim 1, wherein the cutting, the pressing, the trimming, the bending, and the bondings are performed to manufacture each of a plurality of blades of the centrifugal fan.

15. A method of manufacturing a blade for a centrifugal fan, the method comprising:
cutting a first metal sheet to form a positive pressure surface forming member forming a positive pressure surface, the positive pressure surface forming member configuring an entire of the positive pressure surface and the negative pressure surface forming member configuring an entire region of the negative pressure surface;
cutting a second metal sheet, which is distinct from the first metal sheet, to form a negative pressure surface forming member forming a negative pressure surface, the negative pressure surface forming member configuring an entire of the negative pressure surface;
pressing the positive pressure surface forming member and the negative pressure surface forming member to form a first curved surface forming the positive pressure surface and a second curved surface forming the negative pressure surface;
trimming the positive pressure surface forming member and the negative pressure surface forming member to form a shroud bonding surface and a main plate bonding surface;
bending the shroud bonding surface and the main plate bonding surface; and
bonding the positive pressure surface forming member and the negative pressure surface forming member to each other, wherein the bonding of the positive pressure surface forming member and the negative pressure surface forming member to each other includes:
bonding front edges of the positive pressure surface forming member and the negative pressure surface forming member to each other; and
bonding rear edges of the positive pressure surface forming member and the negative pressure surface forming member to each other, wherein the front edges of the positive pressure surface forming member and the negative pressure surface forming member are formed to be in a same shape and the rear edges of the positive pressure surface forming member and the negative pressure surface forming member are formed to be in a same shape, wherein the trimming is implemented such that an upper edge and a lower edge of each of the positive pressure surface forming member and the negative pressure surface forming member are bent independently of the front edge of each of the positive pressure surface forming member and the negative pressure surface forming member in the bending, wherein the shroud bonding surfaces of the positive pressure surface forming member and the negative pressure surface forming member are bent in an opposite direction and bonded on an inner surface of the shroud, and the main plate bonding surfaces of the positive pressure surface forming member and the negative pressure surface forming member are bent in an opposite direction and bonded on an inner surface of the main plate.

16. The method according to claim 15, wherein the first curved surface and the second curved surface define different shapes of curved surfaces.

17. The method according to claim 15, wherein at least one of the bonding between the front edges or the bonding between the rear edges is implemented by resistance welding.

18. The method according to claim 17, wherein the resistance welding comprises spot welding.

19. The method according to claim 17, wherein the resistance welding comprises projection welding, and wherein the method further comprises forming protrusions at any one of the positive pressure surface forming member or the negative pressure surface forming member so as to protrude toward the other one.

* * * * *